Oct. 1, 1963   R. S. CONGLETON ETAL   3,105,928
SELF-OPTIMIZING SERVOMECHANISMS
Filed April 28, 1961   2 Sheets-Sheet 1
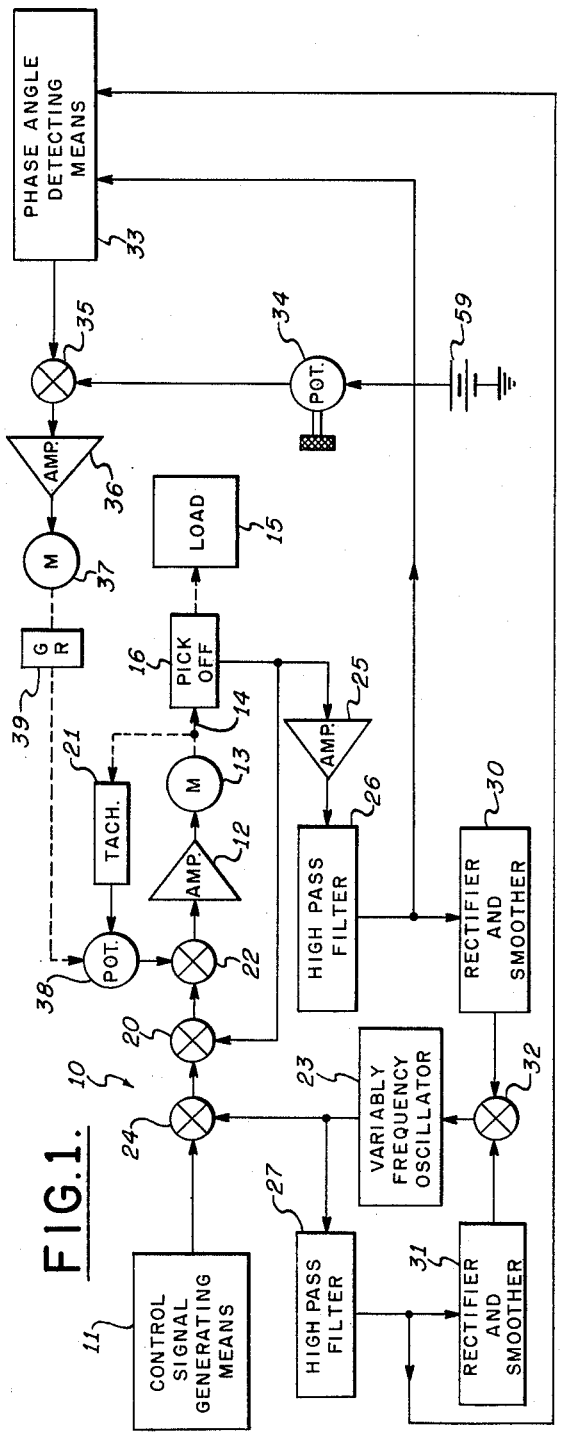
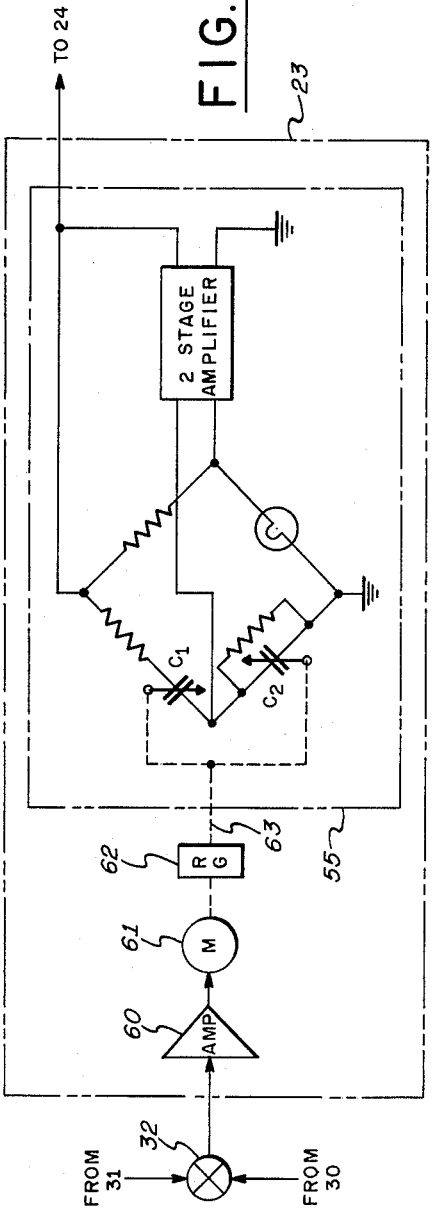
INVENTORS
ROBERT S. CONGLETON
REX E. PAULSEN
BY
ATTORNEY

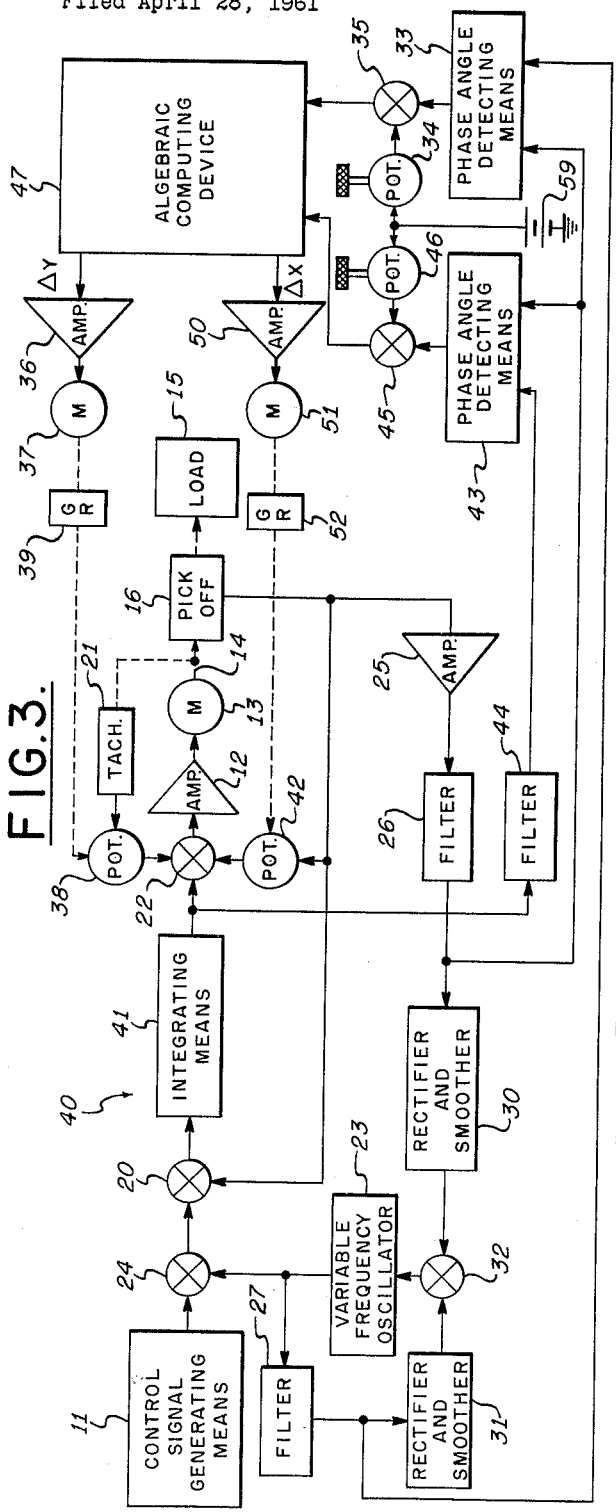
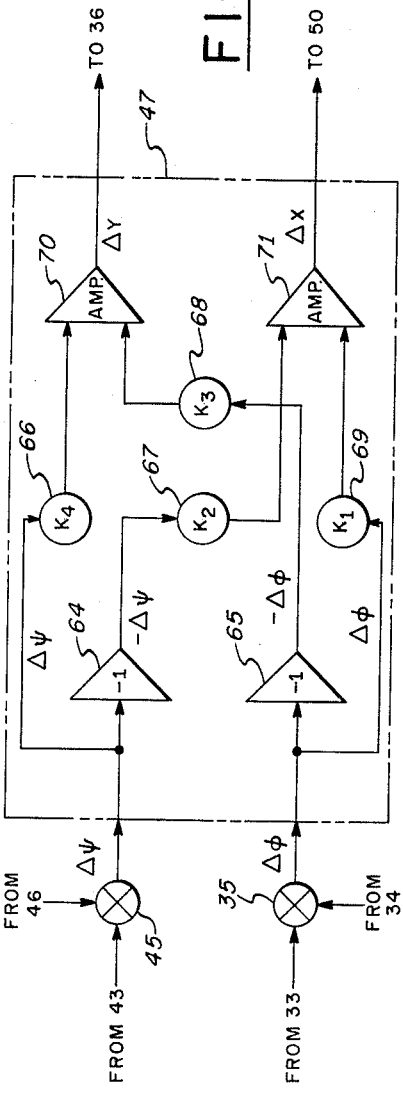

United States Patent Office 3,105,928
Patented Oct. 1, 1963

3,105,928
SELF-OPTIMIZING SERVOMECHANISMS
Robert S. Congleton, Canoga Park, Calif., and Rex E.
Paulsen, Plainview, N.Y., assignors to Sperry Rand
Corporation, a corporation of Delaware
Filed Apr. 28, 1961, Ser. No. 106,353
10 Claims. (Cl. 318—28)

This invention relates to servo systems and in particular to servo systems of the type having stabilizing means which are a function of the speed and position of the servomotor. This invention is particularly directed towards obtaining optimum servo system response by automatically adjusting the gain of the speed and position responsive stabilization means to adapt for changes in the load parameters.

In general, high gain servo systems have a tendency to vacilate or hunt due to the inertia and friction in the system and the low levels of damping naturally associated with the load. This condition is aggravated by sharply fluctuating input control signals which cause a "ringing" response at the loop resonant frequency. Numerous improvements have been suggested for preventing hunting but the majority of these cause the servo system to become sluggish to an undesirable extent. One system which overcomes this undesired characteristic utilizes a damping or stabilization signal which is fed back into the control circuit of the servomotor in a manner to oppose the error signal which energizes the servomotor. This damping signal is a function of the speed of the servomotor and may be obtained for example from a tachometer generator connected to the servomotor output shaft. By this arrangement, which is known as rate damping, the amount of vacillation or hunting in the servo system is appreciably less than that in the other types of systems.

Another problem associated with prior art servo systems is that they fail to provide optimum response to input control signals of widely varying amplitudes. For example, when inherent servomotor damping is relied upon for stabilization, the degree of damping afforded is non-linear with motor speed, being extremely small at low motor speeds. The use of rate feedback stabilization serves to linearize the servomechanism, thereby making its dynamic response characteristic insensitive to the expected variation in motor damping.

With prior art servo systems, of the type which have endeavored to adapt to widely varying load parameters, it has been common to determine the correction which should be made to the servo loop parameters by indirect measurement of the load variation. For example, the spring centering moment on an aileron varies as the square of air speed while the moment of inertia of a gun mount in train varies with the elevation of the gun barrel. Compensation for variations of this nature depends upon (a) a knowledge of the functional relation between servo load parameters and the several independent variables, (b) measurement of the independent variables, (c) computation of the associated load parameter value, and (d) translation of the result into a suitable servo loop correction. Prior art servo systems of this type are generally complicated, expensive and relatively unreliable.

It is therefore a primary object of the present invention to provide a servo system which is self adaptive to widely varying load conditions, maintaining constant relative stability by adjusting one or more accessible servo loop parameters.

It is another object of the present invention to provide a self adaptive servo system which measures the variations in load parameters without reference to externally measured parameters or reference to the functional relation between said parameters and the servo load characteristics.

It is an additional object of the present invention to provide a self-adapting servo system having variable stabilization means which permits optimum response of the servo system under varying load conditions while maintaining the system relatively simple, inexpensive and reliable.

These and other objects are accomplished by the self-optimizing servo system of the present invention which, in its second order form, continuously adjusts the rate stabilization means thereby maintaining constant damping ratio. The system damping ratio is determined by the phase shift of a test signal as it is passed through the servo system. In order to measure the phase shift accurately, the ratio between the frequency of the test signal and the natural frequency of the servo system is maintained constant. Since the phase shift is then representative of the damping ratio of the system, it is compared with a reference phase signal and the difference therebetween is utilized to adjust the damping ratio to maintain it constant. A self optimizing second order servo system is thereby obtained.

In its third order form, the self optimizing servo system of this invention continuously adjusts the speed and position responsive stabilization means thereby maintaining two independent stability factors constant such as, for example, the phase and gain margin. Test signals at three points in the circuit are used to measure a pair of phase shifts. The differences between these two phase angles and their respective reference values are utilized to adjust the speed and position responsive stabilization levels such that the relative stability of the unit is held constant. A self optimizing third order servomechanism is thereby obtained.

Referring to the drawings,
FIG. 1 is a schematic block diagram of a second order self optimizing servo system;
FIG. 2 is a wiring diagram of the variable frequency oscillator of FIG. 1;
FIG. 3 is a schematic block diagram of a third order self optimizing servo system; and
FIG. 4 is a wiring diagram of the algebraic computing device of FIG. 3.

Referring now to FIG. 1, a second order servo system 10 is shown which includes a control signal generating means 11 for providing a varying amplitude control signal to a servo amplifier 12 which in turn is connected to a servomotor 13. The servo amplifier 12 may be of the type disclosed in "Servomechanism Practice," W. R. Ahrendt, McGraw-Hill, 1954, page 117. The output shaft 14 of the servomotor 113 is connected to drive a load 15. To provide a position feedback signal, a position pick-off 16 is connected to be responsive to the position of the shaft 14 and provides a displacement signal having an amplitude and phase representative of the magnitude and direction of the amount of rotation of the shaft 14. The pick-off 16 is connected to an input terminal of a summation device 20 with the pick-off signal applied in opposition to the control signal applied to the other input terminal of the algebraic summation device 20. The summation device 20 is in the forward loop of the servo system 10. To provide a rate feedback signal for stabilization and rate damping purposes, the output shaft 14 of the servomotor 13 is also connected to a tachometer generator 21 which in turn is connected to an input terminal of an algebraic summation device 22 that is also in the forward loop of the servo system 10. The other input terminal of the algebraic summation device 22 is connected to the output terminal of the summation device 20. The rate feedback signal from the tachometer generator 21 is applied in opposition to the error signal appearing on the other input terminal of the summation device 24. The paragraph above describes a convention second order servo system to which the present invention is applied.

A second order servo system of the type described above may be characterized by a single stability parameter, i.e. the damping ratio. Any one of a variety of common measures of performance or goodness may be used as the basis for selecting the optimum value of this parameter. These measures include response time, percent overshoot, minimum mean-squared error, minimum integrated time-multipled absolute error (after Graham and Lathrop), and minimum settling time. The latter two measures of goodness are minimized by choice of 0.7 for the damping ratio, as an example. It may be remarked that the specification of a criterion of optimum is not intended nor is it essential to the present invention. The "best" damping ratio may even be selected on the basis of Wiener filter theory, thus minimizing the level of unwanted noise present in the output signal. For the present purposes, it suffices to suppose that the damping ratio has been selected by some appropriate means.

The present invention controls the system damping ratio to maintain it constant by utilizing a forcing frequency test signal and measuring the phase shift of the test signal as it passes through the servo system. This is based on the following considerations:

(a) If the attenuation of the high frequency test signal through the system is constant, then the ratio of forcing frequency to natural frequency is sensibly constant with little dependence on the system damping ratio.

(b) At high forcing frequencies, and at a constant ratio of forcing to natural frequency, the change in phase angle between the servo system output and input is proportional to the change in the system damping ratio.

On the basis of the above, the present invention utilizes the attenuation of the test signal as a source of information concerning the frequency ratio and as a means of maintaining it constant. Then having a constant frequency ratio, the phase shift of the test signal which is substantially representative of the damping ratio is compared with a reference phase signal and the difference therebetween is applied to vary the rate feedback from the tachometer generator 21 to maintain the system damping ratio constant thereby providing a self optimizing servo system.

In accordance with the above theory, a variable frequency oscillator 23 provides a sinusoidal test signal having a predetermined forcing frequency which is a multiple of the undamped natural frequency of the servo system 10. For example with the second order system shown, a forcing frequency of approximately three times the natural frequency is satisfactory. The oscillator 23 may be of the type disclosed in "Electronic Measurement," Terman, F. E., and Pettit, J. M., McGraw-Hill, 1952, pages 482–486. FIGURE 2 illustrates how the gang-tuning condensers of the Wien bridge in this circuit are turned in response to the error signal appearing at the output of a summation device 32.

The operation of the variable frequency oscillator 23 will now be described with particular reference to FIG. 2. As discussed in the above-referenced text, the output frequency of a Wien bridge oscillator 55 may be adjusted by rotating a shaft 63 connected to a gang-tuned pair of condensers, $C_1$ and $C_2$. Appearing at the output of the summation device 32, there is an error voltage representative of the deviation of the oscillator output frequency from a desired fixed multiple of the servo resonant frequency. This error voltage is multiplied by an amplifier 60 to cause a motor 61 to run thereby turning a shaft 63 through reduction gearing 62 in a direction to reduce the error voltage to zero. The operation of this circuit with the balance of the servomechanism circuitry is further described below.

Referring again to FIG. 1, the forcing frequency test signal from the oscillator 23 is connected to an input terminal of a summation device 24 which has its other input terminal connected to the control signal generating means 11. The control signal from the means 11 and the test signal from the oscillator 23 are applied to the input of the servo system 10, summed in the device 24, and then applied to an input terminal of the algebraic summation device 20. After passing through the servo system 10, a signal representative of the test signal is obtained from the output of the servo system 10 by means of the pick-off 16. Since the servo system 10 acts as a low pass filter, this servo response or output test signal from the pick-off 16 will be considerably attenuated for example by a factor of ten. It is therefore passed through an amplifier 25 whose gain is chosen to bring the output test signal back up to the amplitude of the input test signal. Utilizing a fixed gain in the amplifier 25 requires that the ratio of the forcing frequency of the test signal to the undamped natural frequency of the servo system be held constant. This is accomplished as follows.

The amplifier 25 is connected to a high pass filter 26 which is designed to reject the low frequency servo response to nominal control signals from the means 11 as well as the occasional servo "ringing" response to step input control signals. The output test signal has a relatively high frequency and is therefore attenuated very little by the filter 26 but is shifted considerably in phase. A similar high pass filter 27 is connected to be responsive to the input test signal from the oscillator 23. The high pass filters 26 and 27 are connected to rectifying and smoothing circuits 30 and 31 respectively. The circuit 31 is connected to an input terminal of the algebraic summation device 32 which has its other input terminal connected to the circuit 30. The output terminal of the summation device 32 is connected to the oscillator 23. The rectified and smoothed input and output test signals from the circuits 30 and 31 are compared in the device 32 and if the signals are equal, the oscillator frequency is correct and no correcting action is required.

If, however, the input and output test signals are unequal, an error voltage appears at the output of the device 32 which controls the oscillator 23 to change its frequency such that the desired frequency ratio is again achieved. It will be noted that both inputs to the summation device 32 are dependent upon the oscillator output amplitude, thus reasonable fluctuations in the output amplitude of the oscillator 23 will not prejudice the successful operation of the frequency control. By this arrangement a constant ratio of forcing frequency to natural frequency is maintained in spite of changes in servo system frequency occasioned by changes in load, changes in amplifier gain or changes in the control signal. This in turn permits accurate measurement of the phase angle which is proportional to the damping ratio of the servo system 10. The damping ratio may thus be accurately controlled in accordance with the phase angle in a manner to be explained.

To provide a signal representative of the phase shift of the test signal through the servo system 10, the high pass filters 26 and 27 are connected to a phase angle detecting means 33. Because the frequency of both the input test signal and the output test signal is identical, the phase shift occurring in the filters 27 and 26 respectively will be the same and the relative phase is therefore the phase between the input test signal and the output or servo response test signal. The phase angle detector therefore provides a measure of the phase shift through the servo system which in turn is representative of the actual system damping ratio. The output of the detecting means 33 is a D.C. linear function of phase angle and is independent of the amplitude of the input signals thereto. The detecting means 33 is preferably of the type disclosed in "Electrical Measurements," Terman, F. E., and Pettit, J. M., McGraw-Hill, 1952, pages 271 and 272.

To provide a signal representative of a reference system damping ratio, an adjustable potentiometer 34 has its input terminal connected to a D.C. supply 59. The setting of the potentiometer 34 is representative of a desired phase which in turn is proportional to the desired damping ratio. The detecting means 33 is connected to one input terminal of an algebraic summation device 35 which has its other input terminal connected to the potentiometer 34. The phase signal which is representative of the actual damping ratio from the detector 33 is compared with the reference damping ratio signal from the potentiometer 34 in the summation device 35. When the actual and reference damping ratio signals cancel each other, the damping ratio of the servo system 10 is correct.

However, when the actual and reference damping ratio signals do not cancel each other an error signal appears at the output of the summation device 35. The summation device 35 is connected to an amplifier 36 which is connected to a servomotor 37. The servomotor 37 in turn is connected to drive the wiper of a potentiometer 38 through a reduction gearing 39. The potentiometer 38 is connected in the rate feedback loop between the output terminal of the tachometer generator 21 and an input terminal of the algebraic summation device 22. The amplified error signal from the amplifier 36 thus drives the motor 37 which in turn positions the wiper of the potentiometer 38 in a direction to change the tachometer feedback gain to maintain the system damping ratio constant. It will be noted that the motor 37 in itself acts as an integrator and the change in the gain of the rate feedback loop will be desirably slower than the change in the frequency control through the oscillator 23.

Referring now to FIG. 3, the invention will be applied to a third order servo system 40 which is similar to the second order system 10 described in FIG. 1 with the exception that an integrating means 41 is connected in the forward loop between the summation device 20 and the summation 22. Identical elements in FIGS. 1 and 3 are designated with identical reference characters.

To provide self optimization of a third order servo system 40 requires control over two parameters as compared to one for the second order servo system 10. Retention of the second order servo system's variable gain rate feedback loop provides control over one of the parameters while the addition of a variable gain inner position feedback loop provides control over the other. The variable gain of the inner position feedback loop is obtained by connecting a variable potentiometer 42 between the pick-off 16 and an input terminal of the summation device 22 in a manner to be explained.

Various measures of goodness may be employed to arrive at the optimum values of the two adjustable parameters of the third order servomechanism. From the standpoint of sinusoidal response, the phase and gain margin may be specified; from that of transient response, rise time and settling time may be minimized. A third alternative is to use some integral criterion, such as minimum mean-squared error or minimum integrated time-multiplied absolute error. More elaborate schemes involving linear combinations of the above measures of goodness (or similar measures) may be employed to formulate the overall criterion of optimum. Alternatively the optimum configuration may be determined (using the theory of random processes) so as to minimize the level of noise appearing in the output signal. Again, it must be emphasized that the criterion of optimum is not a part of this invention. It suffices to note that various criteria can be developed, that the system parameters can be selected to satisfy any criterion chosen, and that the devices of the present invention will automatically maintain these parameters at their specified levels.

As with the second order system 10, the attenuation in a third order system 40 at high frequencies provides a measure of the ratio of the forcing frequency to the natural frequency. Then with this ratio maintained constant, measurements are made to determine the error in the system parameters utilizing the phase angle between the input and output test signals as one source of information concerning the system parameters. The second information source is the phase angle between the integrator output test signal and the servo output test signal. In a third order system it is desirable to have the output frequency of the variable frequency oscillator 23 slaved to twice the servo system natural frequency instead of three time the servo system natural frequency as with the second order system 10. Other than this the frequency control loop remains the same as previously explained.

A major difference in the third order system 40 is that the change in phase angle from the reference value is a function of two parameters as opposed to only one in the second order system 10. Thus, in the third order system 40, the commands to change the gain of the variable gain rate and position feedback loops by means of the potentiometers 38 and 42 respectively must be computed from two phase measurements.

Therefore, an additional phase angle detecting means 43 is provided which measures the phase angle between the servo output test signal and the integrator output test signal. To do this, the detecting means 43 has one input terminal connected to the high pass filter 26 and its other input terminal connected to the output terminal of the integrator 41 through a similar high pass filter 44.

The phase angle detecting means 43 measures the phase angle between the servo output test signal and the integrator output test signal and provides a signal accordingly to an input terminal of an algebraic summation device 45. A potentiometer 46 has its input terminal connected with a D.C. supply 59. The potentiometer 46 is adjusted to provide a reference phase signal which is applied to the other input terminal of the summation device 45 in opposition to the actual phase angle signal from the detecting means 43. The output terminals of the summation devices 35 and 45 are connected to respective input terminals of an algebraic computing device 47. The function of the computing device 47 is to take the outputs from the summation devices 35 and 45 which are representative of the difference between the phase of the input and output test signals with respect to a first reference phase signal and the difference between the phase of the integrator and servo output test signals with respect to a second reference phase signal, respectively, to combine the input phase difference signals linearly in accordance with two linear algebraic equations, hence to solve for the gain change required in the rate feedback loop and the variable position feedback loop respectively.

The algebraic computing device 47 is shown in further detail in FIG. 4. The phase difference signal appearing at the output terminal of the summation device 35 is denoted as $\Delta\phi$ and that appearing at the output terminal of the summation device 45 is $\Delta\psi$. The output terminal of the device 45 is connected through a $K_4$ potentiometer 66 to an input terminal of a summing amplifier 70 and through an amplifier 64 and a $K_2$ potentiometer 67 to an input terminal of a summing amplifier 71. The output terminal of the device 35 is connected through an amplifier 65 and a $K_3$ potentiometer 68 to an input terminal of the amplifier 70 and through a $K_1$ potentiometer 69 to an input terminal of the amplifier 71.

The potentiometers 66, 67, 68 and 69 attenuate the signals therethrough by their respective factors in accordance with the following equations:

$$\Delta X = K_1 \Delta\phi + K_2 \Delta\psi$$
$$\Delta Y = K_3 \Delta\phi + K_4 \Delta\psi$$

Analysis has shown this form of the equations to be appropriate where:

$\Delta X$ is proportional to the inner position feedback loop gain error, $\Delta Y$ is proportional to the rate feedback loop gain error, $K_1$ is the partial derivative of X with respect to $\phi$ for values of $\phi_0$ and $\psi_0$ corresponding to optimum.

$K_2$ is the partial derivative of X with respect to $\psi$ for values of $\phi_0$ and $\psi_0$ corresponding to optimum.

$K_3$ is the partial derivative of Y with respect to $\phi$ for values of $\phi_0$ and $\psi_0$ corresponding to optimum.

$K_4$ is the partial derivative of Y with respect to $\psi$ for values of $\phi_0$ and $\psi_0$ corresponding to optimum.

For a third order system, analysis has shown that $K_1$ and $K_3$ are normally negative therefore unity gain polarity-inverting amplifiers 64 and 65 are utilized as shown in FIG. 4.

Referring again to FIG. 3, the output terminal of the computing device 47 on which the signal $\Delta Y$ appears is connected to the amplifier 36 for amplifying the signal which drives the servomotor 37. The servomotor 37 positions the wiper of the potentiometer 38 in a direction to vary the gain of the rate feedback loop to obtain optimum servo response. In a similar manner, the other output terminal of the computing device 47 on which the signal $\Delta X$ appears is connected to an amplifier 50 for amplifying the signal which drives a servomotor 51. The servomotor 51 in turn positions the wiper of the potentiometer 42 through a reduction gearing 54. The wiper of the potentiometer 42 is driven in a direction to vary the gain of the inner position feedback loop to obtain optimum servo response.

The above discussion of the schematic diagram shown in FIGS. 1-4 is for purposes of illustration only and modifications thereof will be obvious to those skilled in the art of servomechanism practice. A few of these modifications will now be cited.

The use of A.C. or D.C. computation in the auxiliary correcting loops is optional. In accordance with current servomechanism practice, the basic servo amplifier 12, servomotor 13 and tachometer 21 are probably, although not necessarily, A.C. devices. The outputs of summation device 32 and phase angle detecting means 33 (and 43 where appropriate) will be D.C. However, the algebraic computing device 47 may be all A.C. or all D.C., as may the auxiliary servo loops consisting of amplifier 36 and motor 37, amplifier 50 and motor 51, and amplifier 60 and motor 61, respectively. Depending upon which form of computation is selected, certain additional modifications which are obvious to one skilled in the art must be made to the circuitry of FIGS. 1-4.

While the three auxiliary loops of FIG. 3, for example, containing amplifiers 36, 50 and 60 are shown as providing simple proportional control, integral control may be preferred. Analysis has shown that integral control will operate quite satisfactorily in these auxiliary loops; it has the further advantage of forcing the steady state error to be zero. Other forms of control such as may be effected by use of passive stabilizing networks may be advantageous. The forms shown in FIGS. 1-4 are chosen for purposes of illustration only and are not intended to limit the scope of this invention.

Finally, the second and third order servomechanisms shown in FIGS. 1 and 3, respectively, rely on feedback elements for stabilization, viz, the tachometer 21 and inner position feedback potentiometer 42. Moreover, the third order servomechanism 40 illustrated in FIG. 3 contains an integrator in the forward loop. Current practice avoids the use of these devices in many applications on grounds of economy. Instead, passive stabilizing networks are inserted in the forward or feedback loops. The adjustment of certain variable elements in these stabilization networks by means of auxiliary control loops can be accomplished in the manner of the examples and in accordance with the principles taught in this invention. The devising of suitable means for accomplishing this objective is obvious to one skilled in the art. Therefore, the illustrations of servomechanisms 10 and 40 in FIGS. 1 and 3 respectively is not intended to limit the scope of this invention to servomechanisms which employ tachometers, integrators, and/or inner position feedback. Rather, it applies to servomechanisms which are generically the same, that is, to second order servomechanisms (as exemplified by FIG. 1) and to third order servomechanisms (as exemplified by FIG. 3).

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A servo system having rate damping comprising control signal generating means for providing a varying amplitude control signal, a controlled object, a servo system responsive to said control signal for controlling said controlled object in accordance therewith, said servo system including a position feedback loop and a rate feedback loop, said rate feedback loop including means for varying the gain thereof thereby varying the damping ratio of said servo system, means for providing a signal representative of a reference damping ratio, means responsive to the operation of said servo system for providing a signal representative of the actual damping ratio, and means responsive to the difference between said actual and reference damping ratio signals for controlling said means for varying the gain of said rate feedback loop in a direction to maintain the damping ratio constant.

2. A servo system having rate damping comprising control signal generating means for providing a varying amplitude control signal, a controlled object, a servo system responsive to said control signal for controlling said controlled object in accordance therewith, said servo system including a position feedback loop and a variable gain rate feedback loop, means for providing a test signal and applying it to said servo system, means for detecting the phase shift of said test signal after passing through said servo system, means for comparing said phase shift of said test signal with a reference phase signal, and means responsive to the difference between the phase of said test and reference signals for varying the gain of said rate feedback loop in a direction to maintain the system damping ratio constant.

3. A servo system having rate damping comprising control signal generating means for providing a varying amplitude control signal, a controlled object, a servo system responsive to said control signal for controlling said controlled object in accordance therewith, said servo system including a position feedback loop and a variable gain rate feedback loop, means for providing a forcing frequency test signal to said servo system, said test signal having a variable frequency, means for varying the frequency of said test signal for maintaining the ratio of said forcing frequency to the natural frequency of said servo system constant, means for detecting the phase shift of said test signal after passing through said servo system, means for comparing said phase shift of said test signal with a reference phase signal, and means responsive to the difference between the phase of said test and reference signals for varying the gain of said rate feedback loop in a direction to maintain the system damping ratio constant.

4. A servo system having rate damping comprising control signal generating means for providing a varying amplitude control signal, a controlled object, a servo system responsive to said control signal for controlling said controlled object in accordance therewith, said servo system including an input, a position feedback loop, a variable gain rate feedback loop and an output, a variable frequency oscillator for providing a forcing frequency test signal to the input of said servo system, means for providing a signal representative of said test signal from the output of said servo system, means for comparing said input and output test signals for providing a signal in accordance with the difference therebetween to said oscillator for varying the frequency of said oscillator to maintain the ratio of said forcing frequency to the natural frequency of said servo system constant, means for comparing the phase of said input and output test signals for providing a signal representative of the phase difference therebetween which is representative of the actual system damping ratio, means for providing a signal representative of a reference system damping ratio, and means responsive to the difference between said actual and reference damping ratio signals for varying the gain of said rate feedback loop in a direction to maintain the system damping ratio constant.

5. A servo system having rate damping comprising control signal generating means for providing a varying amplitude control signal, a controlled object, a servo system responsive to said control signal for controlling said controlled object in accordance therewith, said servo system including an input, a position feedback loop, a variable gain rate feedback loop and an output, a variable frequency oscillator for providing a forcing frequency test signal to the input of said servo system, means for providing a signal representative of said test signal from the output of said servo system, means for compensating for the attenuation of said output test signal by said servo system, high pass filtering means responsive to said input and output test signals for providing filtered versions thereof, rectifying and smoothing means responsive to said filtered test signals for providing rectified and smoothed versions thereof, means for comparing said rectified and smoothed versions of said input and output test signals for providing a signal representative of the difference therebetween, means for applying said difference signal to said variable frequency oscillator for varying the frequency of said oscillator to maintain the ratio of said forcing frequency to the natural frequency of said servo system constant, phase angle detecting means responsive to the filtered versions of said input and output test signals for providing a signal representative of the phase shift through said system which is representative of the actual system damping ratio, means for providing a signal representative of a reference system damping ratio, and means responsive to said actual and reference damping ratio signals for providing a signal representative of the difference therebetween for varying the gain of said rate feedback loop in a direction to maintain the system damping ratio constant.

6. A servo system comprising control signal generating means for providing a variable amplitude control signal, a controlled object, a servo system responsive to said control signal for controlling said controlled object in accordance therewith, said servo system including an input, a position feedback loop, a variable gain rate feedback loop, integrating means in the forward loop between said feedback loops, a variable gain position feedback loop and an output, means for providing a test signal to said servo system, means for providing a first measure representative of the phase shift of said test signal between said servo system input and output, means for providing a first reference signal, means for providing a second measure representative of the phase shift of said test signal between the output of said integrating means and said servo system output, means for providing a second reference signal, means responsive to said first measure and said first reference signal for providing a first signal representative of the difference therebtween, means responsive to said second measure and said second reference signal for providing a second signal representative of the difference therebetween, and means responsive to said first and second difference signals for varying the gain of said rate feedback loop and the gain of said variable position feedback loop to maintain optimum servo system response.

7. A servo system comprising control signal generating means for providing a variable amplitude control signal, a controlled object, a servo system responsive to said control signal for controlling said controlled object in accordance therewith, said servo system including an input, a position feedback loop, a variable gain rate feedback loop, integrating means in the forward loop between said feedback loops, a variable gain position feedback loop and an output, means for providing a test signal to said servo system, means for detecting the phase shift of said test signal after passing through said servo system, means for providing a first reference phase signal, means for comparing the phase shift of said test signal with said first reference signal for providing a first difference signal, means for detecting the phase shift of said test signal from said servo output with respect to that from said integrating means output, means for providing a second reference phase signal, means for comparing the phase shift of said test signal between said integrating means and servo outputs with said second reference phase signal for providing a second difference signal, and means responsive to said first and second difference signals for varying the gain of said rate feedback loop and the gain of said variable feedback loop to obtain optimum servo response.

8. A servo system comprising control signal generating means for providing a variable amplitude control signal, a controlled object, a servo system responsive to said control signal for controlling said controlled object in accordance therewith, said servo system including an input, a position feedback loop, a variable gain rate feedback loop, integrating means in the forward loop between said feedback loops, a variable gain position feedback loop and an output, means for providing a variable forcing frequency test signal to the input of said servo system, means for varying the frequency of said test signal for maintaining the ratio of said forcing frequency to the natural frequency of said servo system constant, means for detecting the phase shift of said test signal after passing through said servo system, means for providing a first reference phase signal, means for comparing the phase shift of said test signal with said first reference phase signal for providing a first difference signal, means for detecting the phase shift of said test signal from said servo output with respect to that from said integrating means output, means for producing a second reference phase signal, means for comparing the phase shift of said test signal between said integrating means and servo outputs with said second reference signal for providing a second difference signal, and means responsive to said first and second difference signals for varying the gain of said rate feedback loop and the gain of said variable position feedback loop to obtain optimum servo response.

9. A servo system comprising control signal generating means for providing a variable amplitude control signal, a controlled object, a servo system responsive to said control signal for controlling said controlled object in accordance therewith, said servo system including an input, a position feedback loop, a variable gain rate feedback loop, an integrator device in the forward loop between said feedback loops, a variable gain position feedback loop and an output, a variable frequency oscillator slaved to a multiple of the servo system natural frequency for providing a test signal to the input of said servo system, means for providing a signal representative of said test signal from the output of said servo system, means for comparing said input and output test signals for providing a signal in accordance with the difference therebetween to said oscillator for varying the frequency of said oscillator to maintain the ratio of said forcing frequency to the natural frequency of said servo system constant, means for detecting the phase shift of said test signal after passing through said servo system, means for comparing the phase shift of said test signal with a first reference signal for providing a first difference signal, means for detecting the phase shift of said test signal of said servo output with respect to said integrator output, means for comparing the phase shift of said test signal between said servo output and integrator output with a second reference signal for providing a second difference signal, and means responsive to said first and second difference signals for varying the gain of said rate feedback loop and the gain of said variable feedback loop to obtain optimum response.

10. A servo system comprising control signal generating means for providing a variable amplitude control signal, a controlled object, a servo system responsive to said control signal for controlling said controlled object in accordance therewith, said servo system including a first input algebraic summation device responsive to said control signal, a position feedback loop, a second algebraic summation device connected to said first algebraic summation device and to said position feedback loop, an integrator device connected to said second algebraic summation device, a variable gain rate feedback loop, a variable gain position feedback loop, a third summation device connected to said variable gain position and rate feedback loops and said integrator, and an output, a variable frequency oscillator connected to said first summation device for providing a forcing frequency test signal to the input of said servo system, pick-off means connected to the output of said servo system for providing a signal representative of said test signal after passing through said servo system, means for compensating for the attenuation of said output test signal by said servo system, high pass filter means responsive to said input and output test signals for providing filtered versions thereof, rectifying and smoothing means responsive to said filtered test signals for providing rectified and smoothed versions thereof, means for comparing said rectified and smoothed versions of said input and output test signals for providing a signal representative of the difference therebetween to vary the frequency of said oscillator to maintain a constant ratio of said forcing frequency to the natural frequency of said servo system, first phase angle detecting means responsive to the filtered versions of said input and output test signals for providing a first phase signal representative of the phase shift through said system, second phase angle detecting means responsive to the filtered versions of said integrator and servo output test signals for providing a second phase signal representative of the phase shift of the servo output signal with respect to the integrator output signal, means for comparing the first phase signal with a first reference phase signal for providing a first difference phase signal, means for comparing the second phase signal with a second reference phase signal for providing a second difference phase signal, algebraic computing means responsive to said first and second difference signals for providing a position feedback loop gain control signal and a rate feedback loop gain control signal, means responsive to said position feedback loop gain control signal for varying the gain of said variable gain position feedback loop, and means responsive to said rate feedback loop gain control signal for varying the gain of said rate feedback loop whereby optimum servo response is obtained.

References Cited in the file of this patent
UNITED STATES PATENTS

| | | |
|---|---|---|
| 2,765,435 | McWilliams et al. | Oct. 2, 1956 |
| 2,862,167 | Curry | Nov. 25, 1958 |
| 2,880,384 | Surtees | Mar. 31, 1959 |
| 2,941,139 | Marx | June 14, 1960 |